(12) United States Patent
Bennett et al.

(10) Patent No.: US 9,604,536 B1
(45) Date of Patent: Mar. 28, 2017

(54) TRANSMISSION AND ENGINE CONFIGURATION

(71) Applicant: Hydro-Gear Limited Partnership, Sullivan, IL (US)

(72) Inventors: Michael L. Bennett, Sullivan, IL (US); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 134 days.

(21) Appl. No.: 14/690,055

(22) Filed: Apr. 17, 2015

Related U.S. Application Data

(63) Continuation of application No. 13/464,236, filed on May 4, 2012, now Pat. No. 9,010,105, which is a continuation-in-part of application No. 12/201,500, filed on Aug. 29, 2008, now abandoned, which is a continuation-in-part of application No. 12/183,624, filed on Jul. 31, 2008, now abandoned.

(60) Provisional application No. 60/953,435, filed on Aug. 1, 2007.

(51) Int. Cl.
*B60K 17/28* (2006.01)
*B60K 17/10* (2006.01)
*F16H 47/02* (2006.01)
*B62D 11/18* (2006.01)

(52) U.S. Cl.
CPC ............ *B60K 17/105* (2013.01); *B60K 17/28* (2013.01); *B62D 11/18* (2013.01); *F16H 47/02* (2013.01); *F16H 2047/025* (2013.01)

(58) Field of Classification Search
CPC ...... B60K 17/105; B60K 17/28; B62D 11/18; F16H 47/02; F16H 2047/025
USPC ............................................. 60/484, 486, 487
See application file for complete search history.

(56) References Cited

U.S. PATENT DOCUMENTS

| | | | |
|---|---|---|---|
| 1,539,616 | A | 5/1925 | Williams |
| 2,914,219 | A | 11/1959 | Chiantelassa |
| 3,279,172 | A | 10/1966 | Yoshito Kudo et al. |
| 3,748,851 | A | 7/1973 | Hause |
| 3,765,258 | A | 10/1973 | Jespersen |
| 3,775,981 | A | 12/1973 | Molly |
| 3,922,931 | A | 12/1975 | Osujyo et al. |
| 4,116,292 | A | 9/1978 | Todeschini et al. |
| 4,129,192 | A | 12/1978 | Todeschini et al. |

(Continued)

FOREIGN PATENT DOCUMENTS

| | | | |
|---|---|---|---|
| EP | 1473183 A2 | 11/2004 | |
| JP | 2000009023 A | 1/2000 | |

(Continued)

OTHER PUBLICATIONS

Dixie Chopper, Operation Manual 1998, Cover Page and pp. 50-51, 60-61, 66, revision #5. 1998.

(Continued)

*Primary Examiner* — Thomas E Lazo
(74) *Attorney, Agent, or Firm* — Neal, Gerber & Eisenberg LLP

(57) ABSTRACT

A drive train configuration is disclosed. The drive train configuration has a transmission or transaxle assembly which may be directly mounted to a vehicle frame. The drive train configuration also comprises an engine that may be attached to a housing of the transmission or transaxle portion. The drive train configuration may also have a power take off mechanism.

20 Claims, 10 Drawing Sheets

(56) References Cited

U.S. PATENT DOCUMENTS

| | | | |
|---|---|---|---|
| 4,252,508 A | 2/1981 | Forster | |
| 4,270,408 A | 6/1981 | Wagner et al. | |
| 4,534,271 A | 8/1985 | Forster | |
| 4,819,508 A | 4/1989 | Yamaoka et al. | |
| 4,887,686 A | 12/1989 | Takei et al. | |
| 4,893,524 A | 1/1990 | Ohashi | |
| 4,934,214 A | 6/1990 | Otte | |
| 4,971,535 A | 11/1990 | Okada et al. | |
| 5,040,429 A | 8/1991 | Del Castillo | |
| 5,078,222 A | 1/1992 | Hauser et al. | |
| 5,207,060 A | 5/1993 | Sheets | |
| 5,247,794 A | 9/1993 | Benson et al. | |
| 5,304,043 A | 4/1994 | Shilling | |
| 5,354,180 A | 10/1994 | Forster et al. | |
| 5,501,578 A | 3/1996 | Skirde et al. | |
| 5,542,307 A | 8/1996 | Hasegawa et al. | |
| 5,555,727 A | 9/1996 | Hauser et al. | |
| 5,628,189 A | 5/1997 | Hauser et al. | |
| 5,800,134 A | 9/1998 | Hasegawa et al. | |
| 5,823,285 A | 10/1998 | Tsuchihashi et al. | |
| 5,918,691 A * | 7/1999 | Ishii | B60K 17/105 180/19.1 |
| 5,957,229 A | 9/1999 | Ishii et al. | |
| 6,022,198 A | 2/2000 | Hoffmeister et al. | |
| 6,199,380 B1 | 3/2001 | Ishii | |
| 6,301,885 B1 | 10/2001 | Johnson et al. | |
| 6,332,393 B1 | 12/2001 | Trimble | |
| 6,361,282 B1 | 3/2002 | Wanschura et al. | |
| 6,363,815 B1 | 4/2002 | Ishimaru et al. | |
| 6,382,339 B1 | 5/2002 | Nemoto | |
| 6,425,244 B1 | 7/2002 | Ohashi et al. | |
| 6,474,218 B2 | 11/2002 | Saito et al. | |
| 6,487,856 B1 | 12/2002 | Ohashi et al. | |
| 6,494,686 B1 | 12/2002 | Ward | |
| 6,533,695 B2 | 3/2003 | Pollman et al. | |
| 6,571,894 B2 * | 6/2003 | Ishimaru | A01D 69/002 180/337 |
| 6,616,563 B2 | 9/2003 | Hasegawa et al. | |
| 6,672,058 B1 | 1/2004 | Langenfeld et al. | |
| 6,672,843 B1 | 1/2004 | Holder et al. | |
| 6,682,058 B1 | 1/2004 | Németh et al. | |
| 6,705,840 B1 | 3/2004 | Hauser et al. | |
| 6,736,605 B2 | 5/2004 | Ohashi et al. | |
| 6,779,615 B2 | 8/2004 | Boyer et al. | |
| 6,811,510 B1 | 11/2004 | Langenfeld et al. | |
| 6,820,403 B2 | 11/2004 | Umemoto | |
| 6,843,056 B1 | 1/2005 | Langenfeld et al. | |
| 6,877,302 B2 | 4/2005 | Samejima et al. | |
| 6,973,783 B1 | 12/2005 | Hauser et al. | |
| 6,988,580 B2 | 1/2006 | Ohashi et al. | |
| 7,028,472 B2 | 4/2006 | Ohashi et al. | |
| 7,044,259 B2 | 5/2006 | Stoll et al. | |
| 7,056,101 B1 | 6/2006 | Hauser et al. | |
| 7,137,250 B1 | 11/2006 | McCoy et al. | |
| 7,146,810 B1 | 12/2006 | Hauser et al. | |
| 7,147,810 B2 | 12/2006 | Reinhard et al. | |
| 7,162,870 B1 | 1/2007 | Hauser | |
| 7,225,617 B1 | 6/2007 | Langenfeld et al. | |
| 7,347,047 B1 | 3/2008 | Hauser | |
| 7,367,185 B1 | 5/2008 | McCoy et al. | |
| 7,370,714 B2 | 5/2008 | Yasuda et al. | |
| 7,377,105 B1 | 5/2008 | Raymond | |
| 7,392,654 B1 | 7/2008 | Hauser et al. | |
| 7,455,132 B2 | 11/2008 | Acharya et al. | |
| 7,536,857 B1 | 5/2009 | Hauser et al. | |
| 7,621,353 B2 | 11/2009 | Ishii et al. | |
| 7,673,712 B2 * | 3/2010 | Iida | A01D 69/08 180/53.1 |
| 7,900,447 B1 | 3/2011 | Hauser et al. | |
| 8,443,598 B1 | 5/2013 | Hauser et al. | |
| 2002/0189885 A1 | 12/2002 | Ruebusch et al. | |

FOREIGN PATENT DOCUMENTS

| | | |
|---|---|---|
| JP | 2001146951 A | 5/2001 |
| JP | 2001263259 A | 9/2001 |
| WO | 9967532 A1 | 12/1999 |

OTHER PUBLICATIONS

Non-Final Office Action issued on Dec. 30, 2010 with respect to U.S. Appl. No. 12/183,624.

Notice of Allowance issued on Jul. 7, 2010 with respect to U.S. Appl. No. 12/184,370.

Notice of Allowance issued on Oct. 18, 2010 with respect to U.S. Appl. No. 12/184,370.

* cited by examiner

TRANSMISSION AND ENGINE CONFIGURATION

RELATED APPLICATIONS

This application is a continuation of U.S. Non-Provisional patent application Ser. No. 13/464,236 filed May 4, 2012, which is a continuation-in-part of U.S. Non-Provisional patent application Ser. No. 12/201,500 filed on Aug. 29, 2008, which is a continuation-in-part of U.S. Non-Provisional patent application Ser. No. 12/183,624 filed on Jul. 31, 2008, which claims priority to U.S. Provisional Patent Application No. 60/953,435 filed on Aug. 1, 2007. These prior applications are incorporated by reference herein in their entirety.

BACKGROUND OF THE INVENTION

This invention relates to drive train configurations; in particular, drive train configurations that include a prime mover or engine and a transmission or transaxle assembly.

SUMMARY OF THE INVENTION

An engine and transmission assembly is disclosed herein. The transmission assembly may include gearing and axles. The engine is physically supported by the transmission assembly, forming a drive train assembly. The details of the invention are set forth below in connection with the detailed description of the embodiments.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
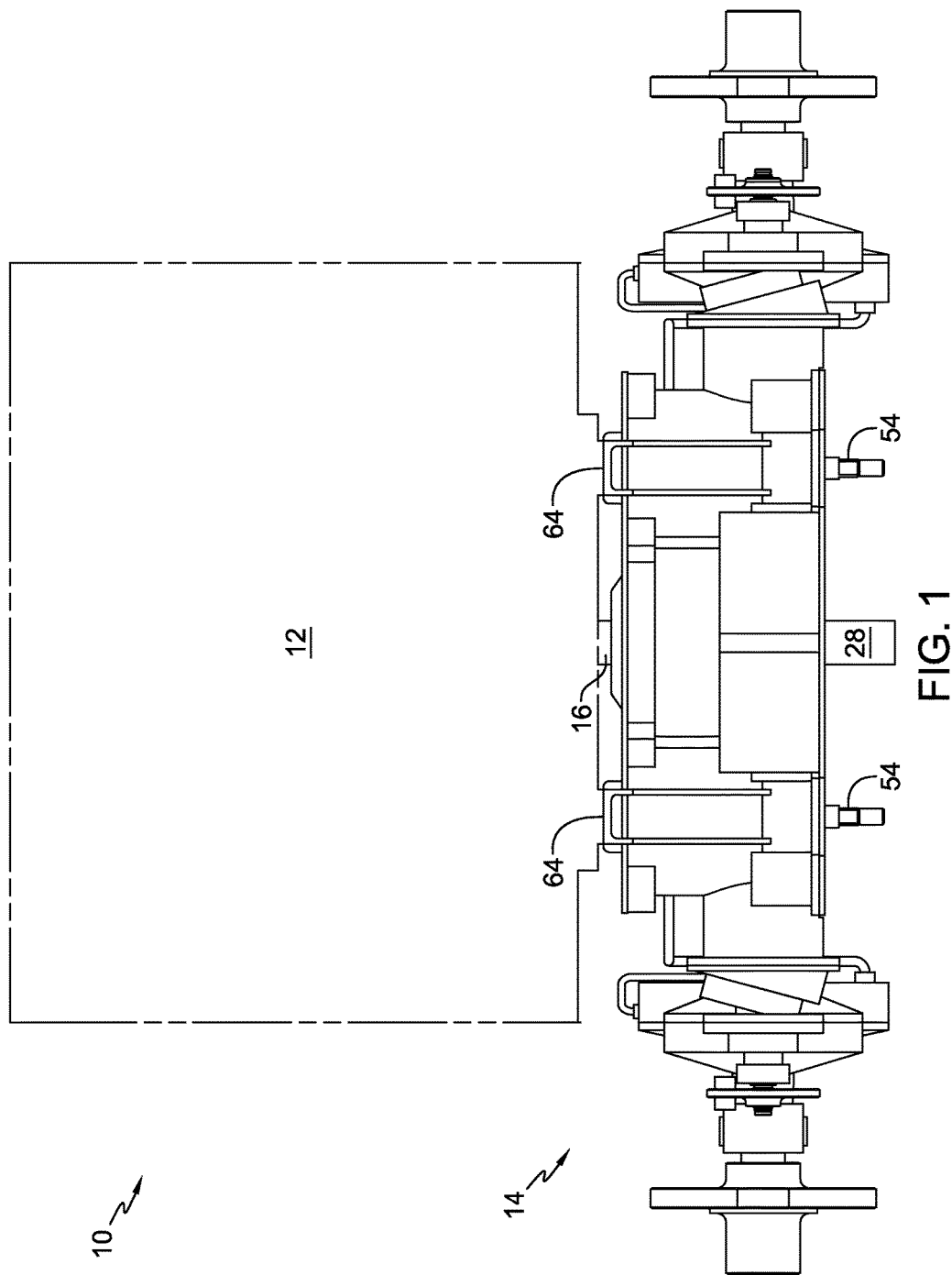
FIG. 1 is an elevation view of an embodiment of the present invention.
Figure 8:
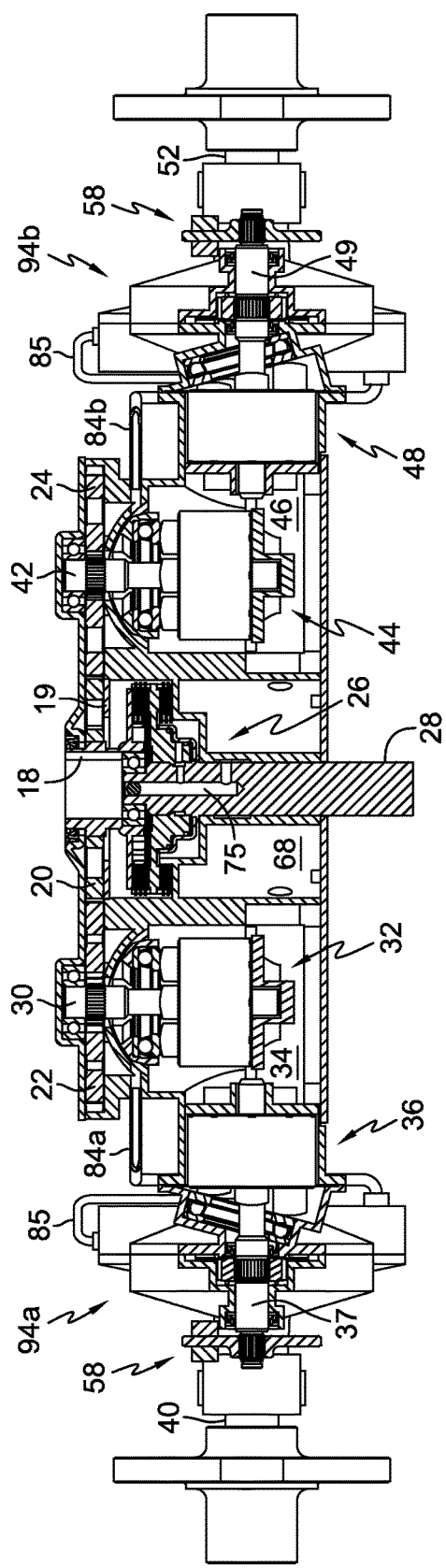
FIG. 8 is a partially sectioned view along the line 8-8 in FIG. 7, excluding the vehicle frame.

Turning now to the figures, there is illustrated in FIG. 1 an embodiment of the invention. Drive train assembly 10 comprises a prime mover in the form of engine 12, which is mounted on a transmission or transaxle assembly 14. Additional details of transaxle assembly 14 may be seen in FIGS. 2 and 3. Engine 12 has an output shaft 16 that engages input member 18 of transaxle assembly 14. As shown in FIG. 1, output shaft 16 drives input member 18 which in turn drives first gear 20. First gear 20 then drives second gear 22 and third gear 24. Input member 18 is also selectively engageable to power take off 26, as shown in FIG. 8 and as discussed in detail below. When power take off 26 is engaged, output shaft 16 is coupled to power take off shaft 28, which may then be used to drive an implement such as a mowing deck (not shown) or have a pulley mounted thereon for the purpose of connecting power take off shaft 28 by means of a belt to a driven device such as an auxiliary pump (not shown).

Power take off mechanisms, such as power take off 26, are well known in the art. Moreover, it will be appreciated by those in the art that any number of power take off mechanisms will be covered by the scope of the present invention. In the embodiment shown, output shaft 16 is coupled to input member 18. Input member 18 is the coupling rotor of power take off 26. Input member 18 is splined (or otherwise engaged), as shown in FIGS. 8 and 10, to first gear 20 so that output shaft 16 drives both power take off input member 18 and first gear 20.

A brake assembly 58 may be located on each of the motor output shafts 37 and 49. The disc-style brake assembly 58 shown is well known in the art and is not illustrated in detail. Additional elements that may house and actuate brake pads 59 are not shown but are well known in the art.

Figure 9:
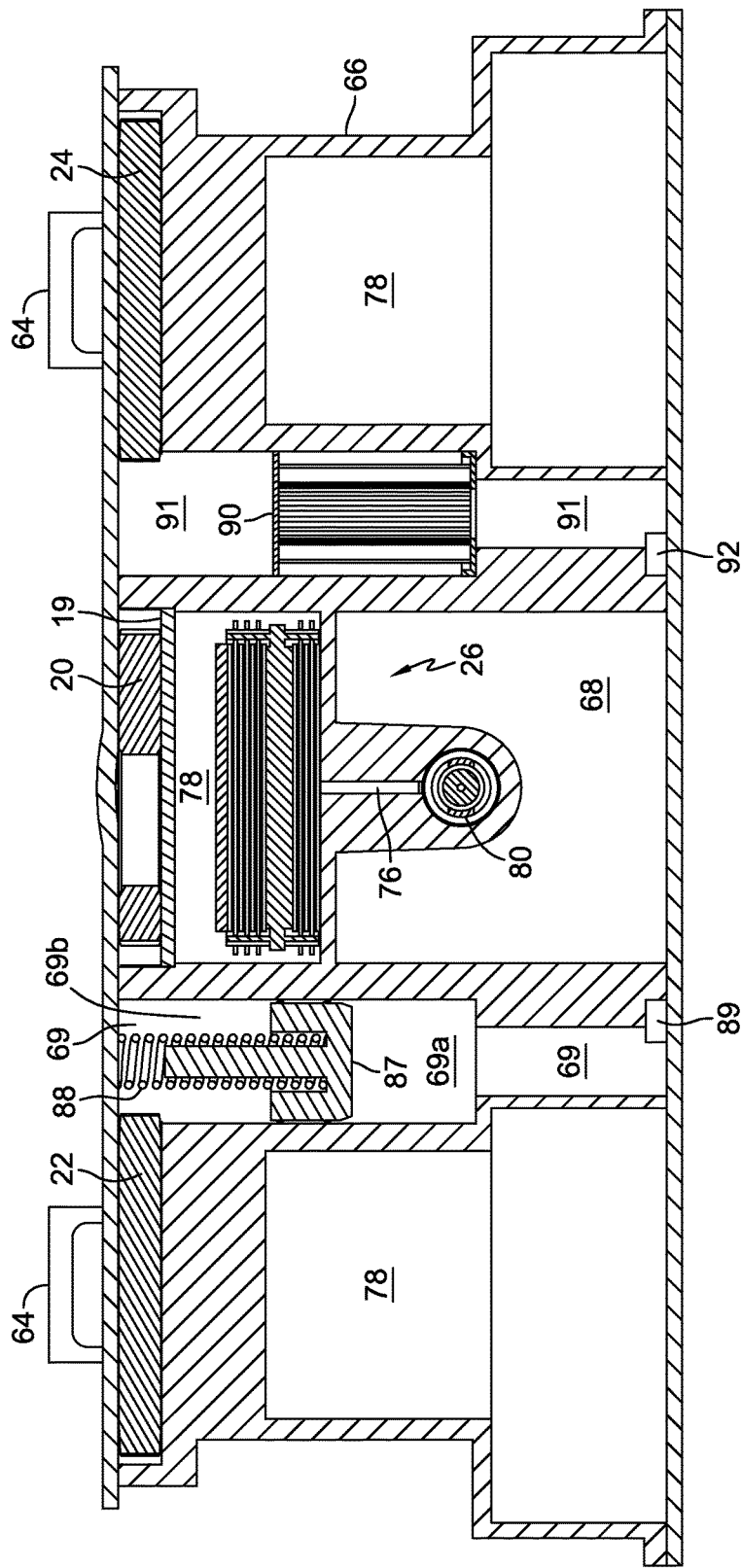
FIG. 9 is a cross-sectional view along the line 9-9 in FIG. 7.
Figure 10:
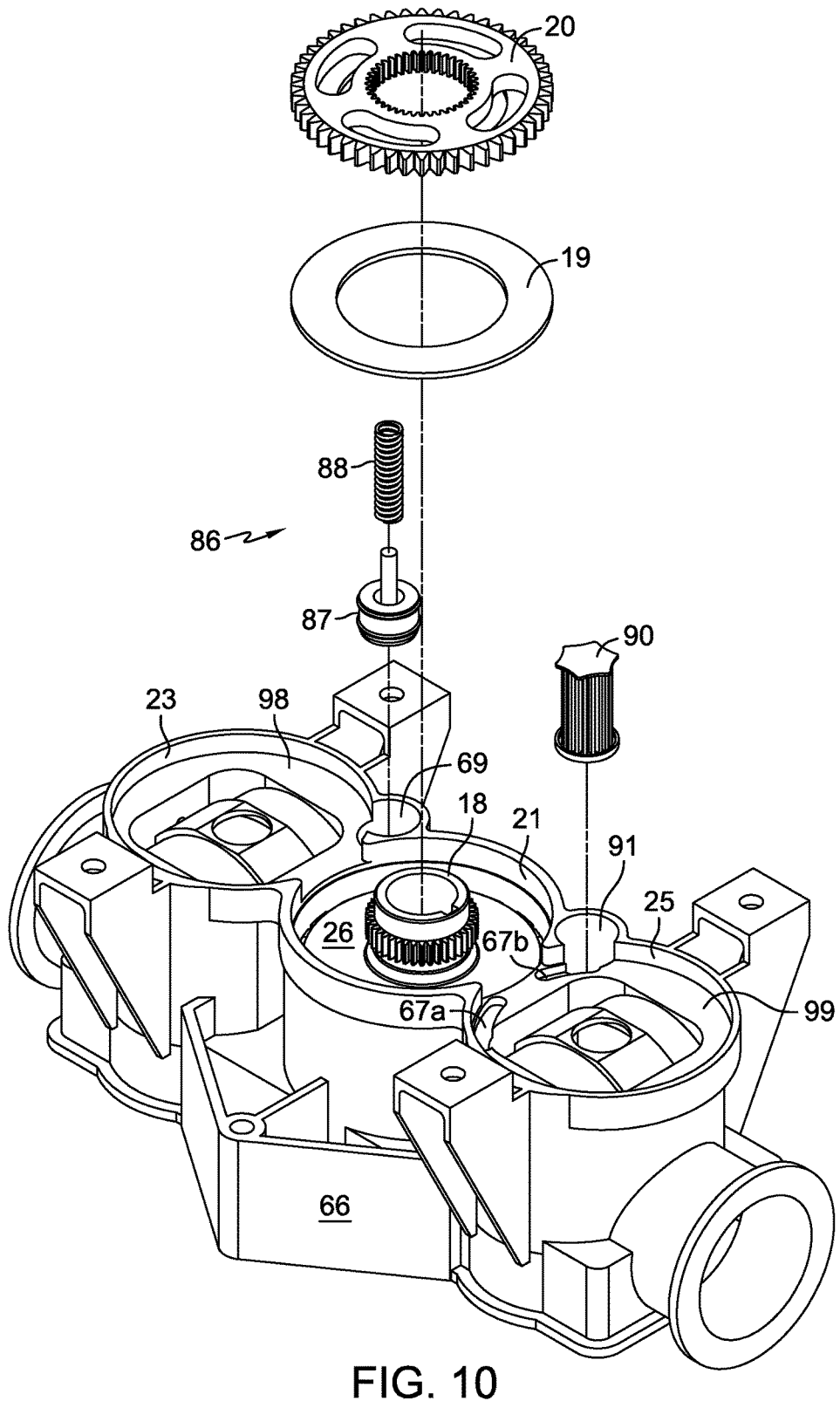
FIG. 10 is an exploded perspective view of certain elements of the present invention.

As shown in FIGS. 8, 9 and 10, first gear 20 rotates in gear chamber 21 on pressure plate 19, which is seated in central housing 66. Pressure plate 19 serves as a gear pump running surface for gear 20. Second gear 22 rotates in second gear chamber 23 on gear pump running surface 98 and third gear 24 rotates in third gear chamber 25 on gear pump running surface 99. In the embodiment shown, gear pump running surfaces 98 and 99 are integrally formed in housing 66. In an alternative embodiment (not shown) pressure plates similar to pressure plate 19 may be added to gear chambers 98 and 99 to prevent excessive wear to housing 66.

Figure 3:
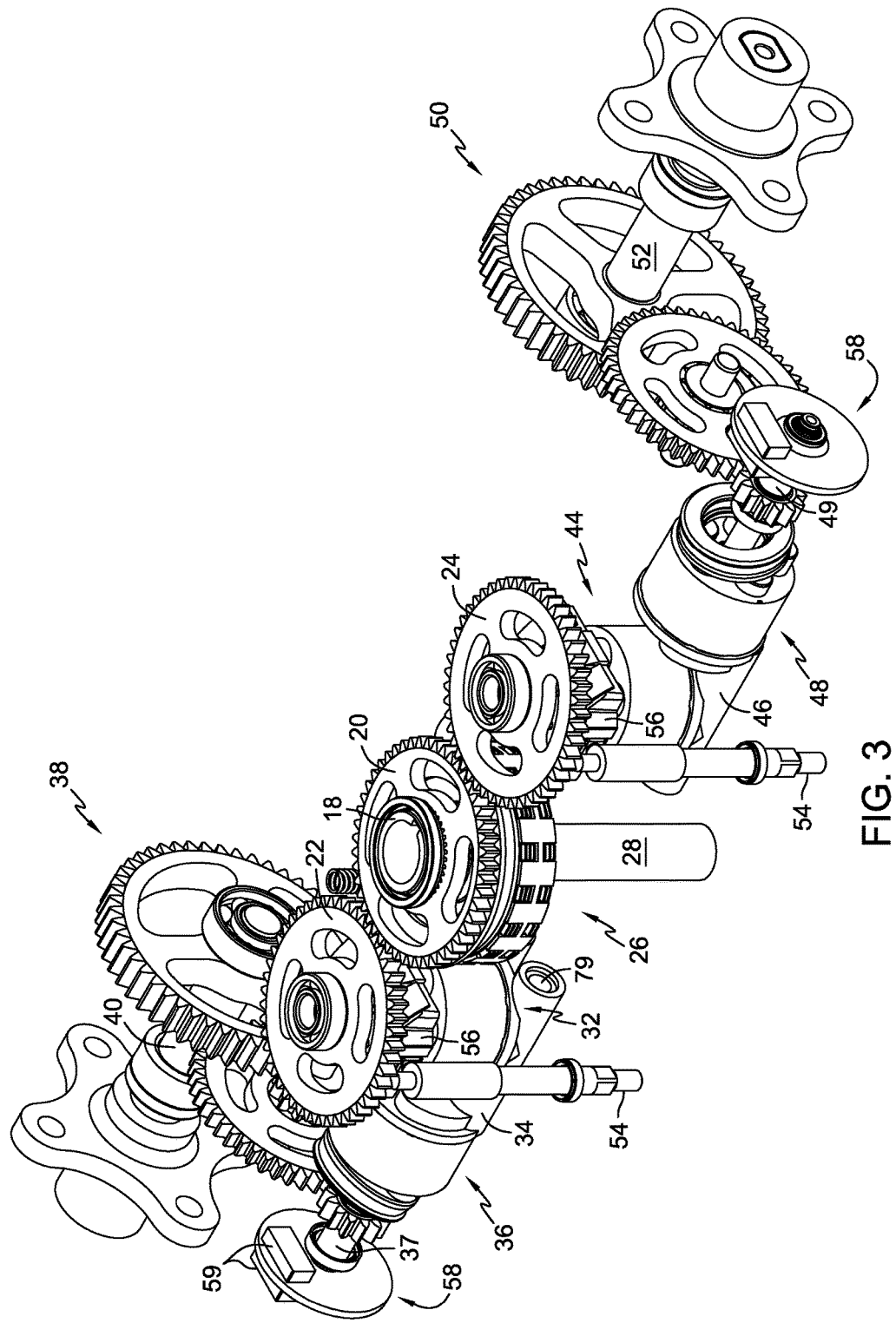
FIG. 3 is a perspective view of the embodiment shown in FIG. 2 with various elements, including external housings and tubes, removed for clarity.
Figure 4:
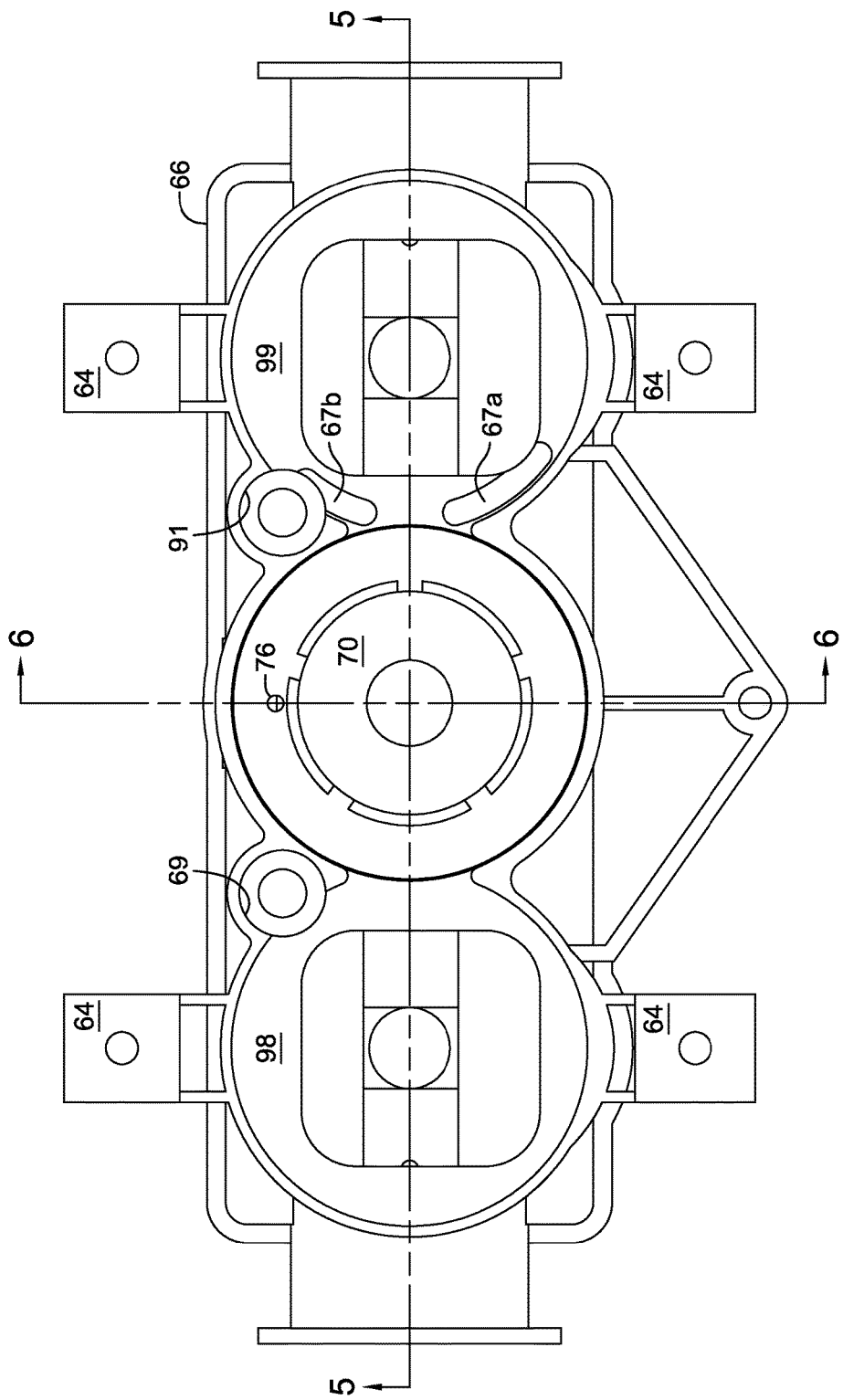
FIG. 4 is a plan view of the central housing of the embodiment shown in FIG. 2.

The configuration and operation of hydraulic pumps, motors, shafts and gearing such as that shown in FIGS. 3 and 8 is well known in the art and will only briefly be explained herein. Details of such hydraulic components can be found, for example, in U.S. Pat. No. 6,705,840, which is incorporated herein by reference in its entirety. Second gear 22 is coupled to a first pump shaft 30 that then drives first pump 32. First pump 32 may be mounted on a first center section 34, on which may be mounted a first motor 36. First motor 36 may then drive a first gear train 38 that then drives a first axle shaft 40. Axle shaft 40 may drive a vehicle tire (not shown) or other mechanism. First motor 36 may also directly drive axle shaft 40 rather than driving a gear train.

Third gear 24 is similarly coupled to second pump shaft 42 that then drives second pump 44. Second pump 44 may be mounted on a second center section 46, on which may be mounted a second motor 48. It will be understood that center sections 34 and 46 will include hydraulic porting (not shown) to connect the respective pumps and motors. Second motor 48 may then drive a second gear train 50 that then drives a second axle shaft 52. Second axle shaft 52 may drive a vehicle tire (not shown) or other mechanism. Second motor 48 may also directly drive second axle shaft 52 rather than driving a gear train.

In combination, gears 20 and 22 or gears 20 and 24 may form a gear pump that may be used to provide replenishment fluid to first pump 32 and first motor 36 and second pump 44 and second motor 48 as well as hydraulic pressure to actuate power take off 26. Generally, using input gears as gear pumps is generally known in the art, an example of which is disclosed in, for example, U.S. Pat. No. 7,225,617, which is incorporated herein by reference in its entirety.

Drive train assembly 10 and transaxle assembly 14 may further comprise actuator arms 54 to modify the position of swash plates 56, and thus the displacements of first pump 32 and second pump 44. First motor 36 and second motor 48 may also be adjustable in displacement.

Figure 2:
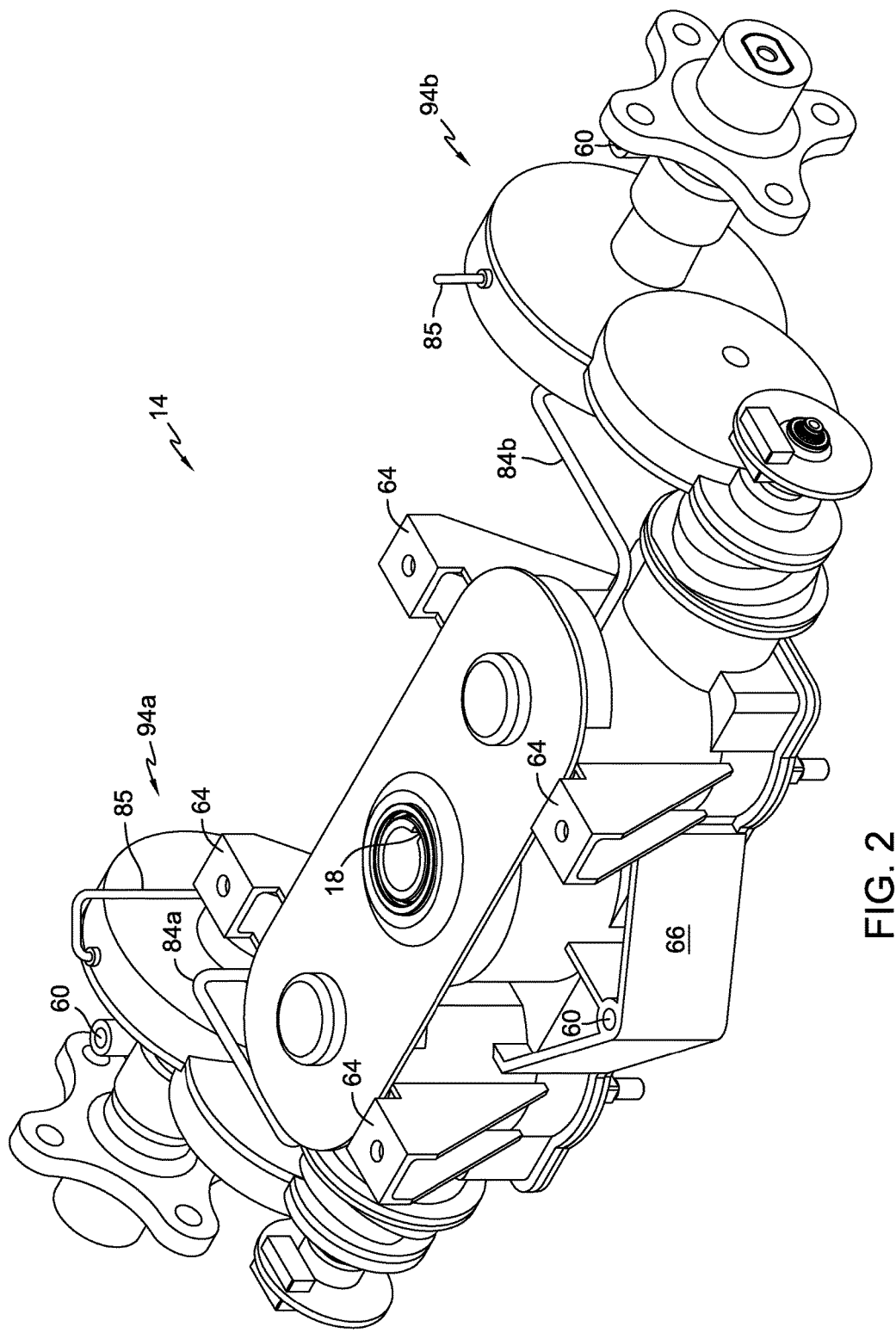
FIG. 2 is a perspective view of the transaxle portion of the embodiment shown in FIG. 1.
Figure 6:
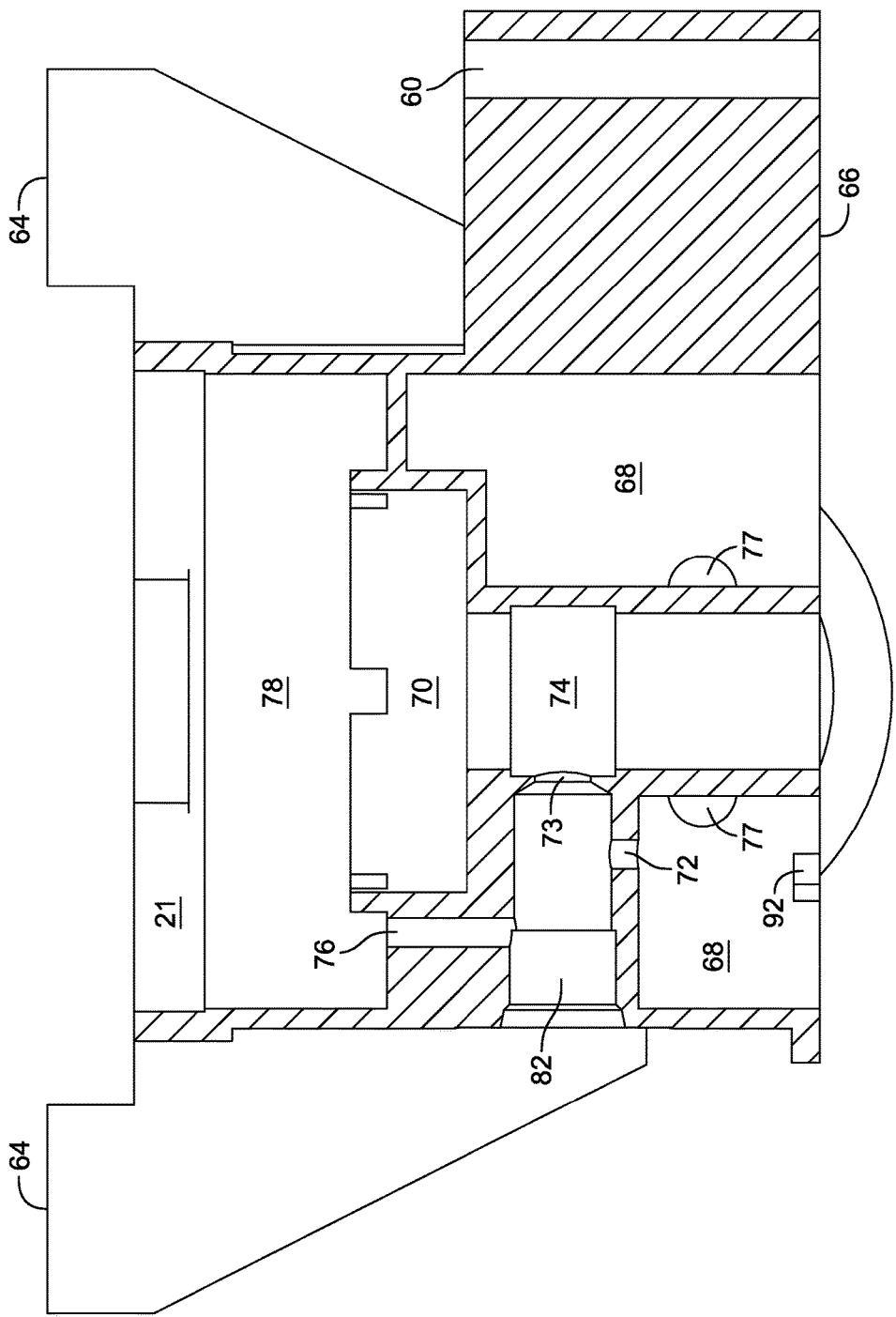
FIG. 6 is a cross-sectional view along the line 6-6 in FIG. 4.
Figure 7:
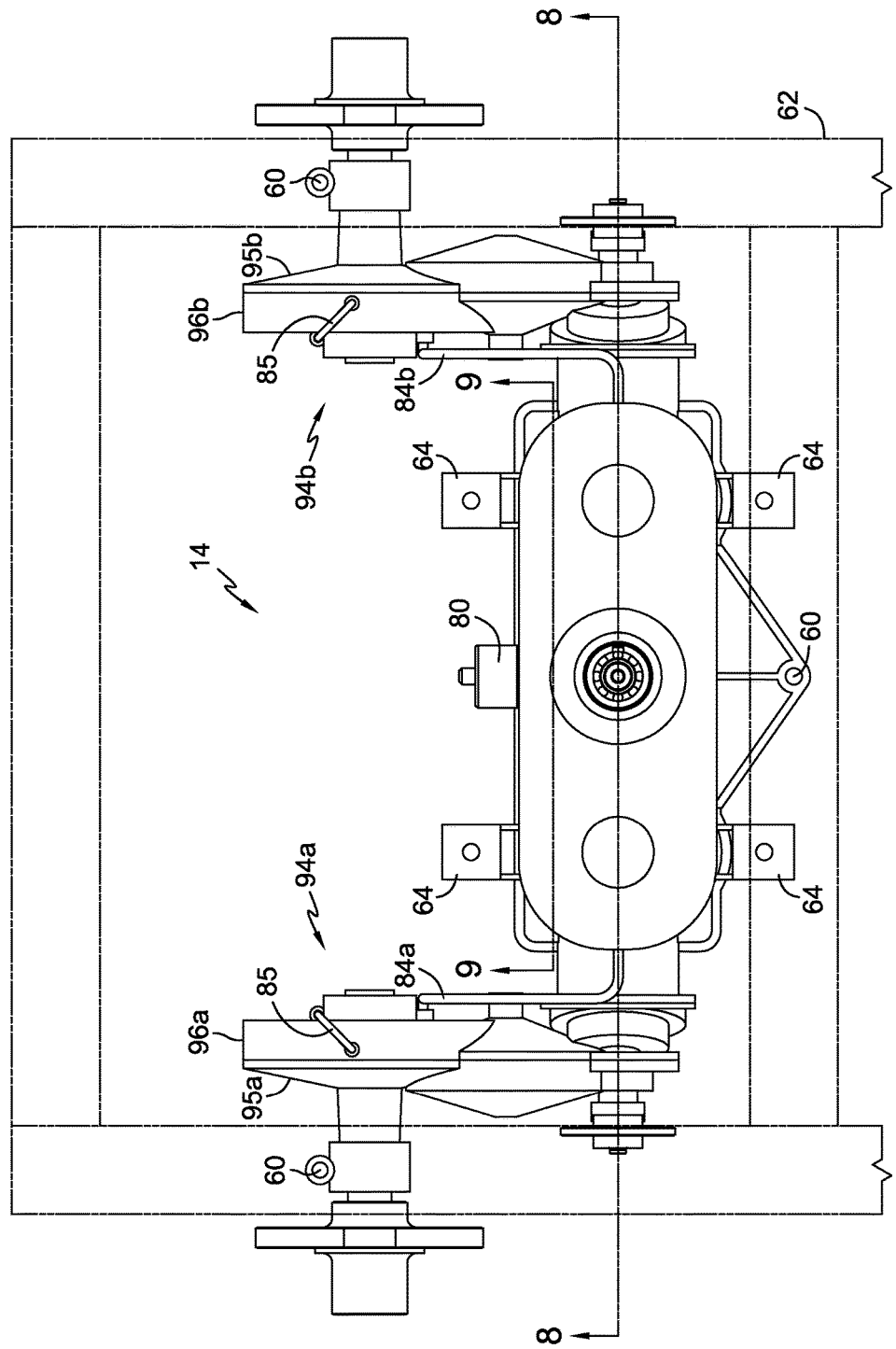
FIG. 7 is a plan view of the transaxle portion mounted on a vehicle frame.

The housings of transaxle assembly 14 may provide multiple functions. By way of example, the housings may provide containment for the internal elements of transaxle assembly 14 previously described. As shown in FIGS. 2 and 7, the housings may also provide attachment points 60 to aid in attachment of drive train assembly 10 to a vehicle frame 62. Central housing 66 shown in, among others, FIGS. 2, 4, 5, 6 and 7, also provides engine support pads 64 for attachment of engine 12. Thus, attachment of engine 12 to transaxle assembly 14 creates drive train assembly 10 and allows an equipment manufacturer to simplify installation of the engine and transaxle assembly by forming a unitary assembly prior to installation in a vehicle. Three-point attachment of assembly 10 to frame 62 is illustrated in FIG. 7, but additional attachment points may be added to housing members of transaxle 14, if needed. This may be done to reduce and control stresses imparted to transaxle 14 when frame 62 flexes.

Figure 5:
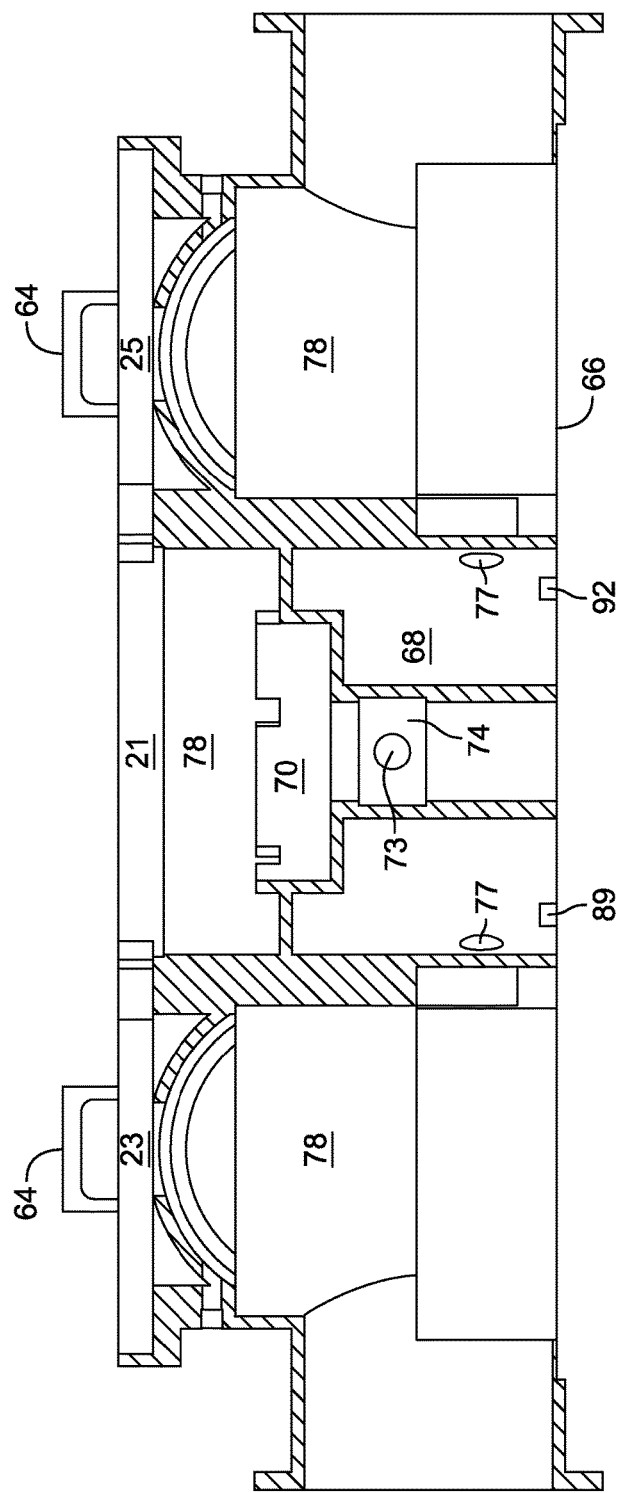
FIG. 5 is a cross-sectional view along the line 5-5 in FIG. 4.

Central housing 66 may also provide locations for numerous elements of drive train assembly 10. For example, accumulator chamber 68 may be provided to help operate power take off 26 and to function as a charge fluid gallery to provide replenishment fluid to first center section 34 and second center section 46. Additionally, central housing 66 may comprise passages 77, which connect chamber 68 to center sections 34 and 46 as shown in FIGS. 5 and 6. There are two passages 77 connecting chamber 68 with each of the center sections 34 and 46. Check valves 79, located in center sections 34 and 46 between each passage 77 and pumps 32 and 34, may additionally be provided. Accumulators such as accumulator chamber 68 are well known in the art and will not be described in detail herein. Moreover, it will be appreciated by those of skill in the art that any number of accumulators will be covered by the scope of the present invention. As such, the elements of the accumulator chamber 68 will only be generally described.

In the depicted embodiment as shown in FIGS. 9 and 10, piston 87 interfaces with the wall of piston chamber 69 in central housing 66 such that it divides accumulator piston chamber 69 into a lower portion 69a and upper portion 69b. Pressurized fluid may flow into accumulator piston chamber 69 from accumulator chamber 68. The pressure in the lower portion of accumulator piston chamber 69 is equal to the pressure in the hydraulic circuit formed in drive transaxle assembly 14. Under normal operating conditions, the force from the fluid pressure is greater than the force provided by spring 88 and thus spring 88 is compressed. If for any reason, such as the engagement of power take off 26, there is a pressure drop across the transaxle assembly 14, the force in spring 88 will be greater than the force from the fluid pressure and piston 87 driven by spring 88 will descend into lower portion 69a of accumulator piston chamber 69, pushing the accumulated lower pressure fluid into chamber 68 through passage 89 thus repressurizing the hydraulic circuit in transaxle assembly 14 for a short period of time.

As shown in, e.g., FIG. 6, a pocket 70 may be provided in central housing 66 to locate a power take off clutch assembly and optional brake (not shown) of power take off 26. The brake which may be located in pocket 70 facilitates deceleration of power take off shaft 28 and then prevents shaft 28 from moving when the power take off 26 is in a non-actuated condition.

A valve 80 may also be provided in central housing 66 to control power take off 26. Valve 80 may be manually actuated or may be remotely hydraulically or electrically actuated. The details of such manual or remote actuation are not shown, but such manual and remotely actuated valves are well known in the art. Valve 80 may reside in a port 82 formed in central housing 66. Pressurized fluid flows from accumulator chamber 68 into valve 80 by way of opening 72. Valve 80 then directs pressurized fluid through opening 73 to annular region 74, which is accessible to internal passages 75 formed in power take off shaft 28.

Pressurized fluid in internal passages 75 may cause power take off 26 to be actuated. For example, pressurized fluid flowing from internal passages 75 may move a clutch piston, which in turn compresses clutch stators and clutch rotors, engaging a power take off clutch assembly and coupling input member 18 with power take off shaft 28. Similarly, valve 80 may release pressure by way of passage 76 to reservoir 78 to permit power take off 26 to be deactivated. Valve 80 may also provide a pathway to release pressure from any passageways associated with a brake or a power take off clutch assembly.

Additionally, fluid filter 90 may also be provided inside central housing 66 as shown in FIGS. 9 and 10. The details of fluid filter 90 are not shown because fluid filters are well known in the art. Those of ordinary skill in the art will also understand that fluid filter 90 may be located at a multitude of locations along the hydraulic circuit formed in central housing 66 which drives transaxle assembly 14. In the depicted embodiment, pump kidneys 67a and 67b are formed in running surface 99 of housing 66 to serve as fluid passages to provide pressurized fluid (resulting from the interface of gears 20 and 24) to filter chamber 91. Pressurized fluid flows through filter 90 into chamber 68 by way of passage 92.

Certain optional elements may be provided. For example, an expansion tank, expansion volume or expansion volumes may be present. An internal expansion volume may be formed when gear train housing elements 95a and 96a are assembled together to form gear train housing assembly 94a on one side of housing 66 and a separate volume may be formed when gear train housing elements 95b and 96b are assembled together to form gear train housing assembly 94b on the opposite side of housing 66.

Expansion tubes 84a and 84b as shown in FIGS. 2, 7 and 8 (or equivalent internal passages not shown) connect reservoir 78 of housing 66 with the fluid expansion volume in gear train housing assemblies 94a and 94b, respectively. Housing assemblies 94a and 94b include overflow tubes 85 in the event fluid expands to a volume greater than the expansion volume available in gear train housing assemblies 94a and 94b. Note that it may be possible to use only one of the housing assemblies 94a or 94b as an expansion volume and therefore, only one of the expansion tubes 84a or 84b may be needed, but both housing assemblies 94a and 94b may still require overflow tubes 85 or other known venting elements.

In order for gear train housing assemblies 94a and 94b to function as expansion tanks, they must be sealed from housing 66 so that the fluid volumes contained in housing assemblies 94a and 94b are separated from the housing 66 fluid volume in a manner which permits fluid transfer (discharge and siphoning) through each of tubes 84a and 84b. If they are not sealed from housing 66 in a manner that allows them to be used as internal fluid expansion compartments, then an external expansion tank may be required.

In an alternate embodiment (not shown), output shaft 16 of engine 12 may rotate in the opposite direction. In that case, the positions of filter 90 and accumulator piston assembly 86 may be switched due to the resultant switch between pressure sides related to forward and reverse of a vehicle. As shown, the configuration of chambers 69 and 91 may be equivalent to enable easy switching of these elements and therefore, flexibility in manufacturing. Note that pump kidneys 67a and 67b would be formed in running surface 98 instead of running surface 99 to accommodate opposite rotation of shaft 16.

While specific embodiments have been described in detail, it will be appreciated by those skilled in the art that various modification and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A drive train assembly for mounting on a vehicle frame, the drive train assembly comprising:
   a transaxle housing configured for mounting on the vehicle frame, the transaxle housing comprising a plurality of engine mounting pads;
   a transmission disposed in the transaxle housing and comprising a first hydraulic pump driven by a first pump shaft, a first motor connected to and driven by the first hydraulic pump, a first motor shaft engaged to and driven by the first motor, a second hydraulic pump driven by a second pump shaft, a second motor connected to and driven by the second hydraulic pump and a second motor shaft engaged to and driven by the second motor;
   a prime mover mounted directly to the transaxle housing and supported by the plurality of engine mounting pads, the prime mover having an output shaft driving a transmission input to power the first pump shaft and the second pump shaft of the transmission, wherein the prime mover output shaft is parallel to both the first pump shaft and the second pump shaft;
   a selectively actuated power take off engaged to the transaxle housing and powered by the transmission input; and
   a first axle shaft drivingly engaged to the first motor shaft and a second axle shaft drivingly engaged to the second motor shaft, wherein the first and second axle shafts are perpendicular to the first and second pump shafts.

2. The drive train assembly of claim 1, wherein the transaxle housing comprises a central housing, a first gear train housing disposed on a first end of the central housing and having a first gear train disposed therein and driven by the first motor shaft, a second gear train housing disposed on a second end of the central housing, opposite the first end and having a second gear train disposed therein and driven by the second motor shaft, wherein the first axle shaft extends from the first gear train housing and the second axle shaft extends from the second gear train housing.

3. The drive train assembly of claim 2, wherein the first and second axles have a coaxial first axis of rotation, and the first and second motor shafts have a coaxial second axis of rotation, and the first axis of rotation is offset from the second axis of rotation.

4. The drive train assembly of claim 1, further comprising a fluid filter disposed inside the transaxle housing.

5. The drive train assembly of claim 1, wherein the power take off is controlled by a manually actuated valve.

6. The drive train assembly of claim 5, wherein the output shaft is coaxial with the prime mover output shaft.

7. A drive train assembly comprising:
   a prime mover having a prime mover output shaft, the prime mover output shaft having a proximal end and a distal end;
   a transaxle housing configured to be mounted to a vehicle frame, the transaxle housing comprising a first end, a second end and a plurality of mounting pads for mounting the prime mover directly on the transaxle housing;
   a first hydraulic pump and a second hydraulic pump disposed inside the transaxle housing;
   a first pump shaft driving the first hydraulic pump and a second pump shaft driving the second hydraulic pump, wherein the first and second pump shafts are parallel with the prime mover output shaft;
   a first motor disposed in the transaxle housing and hydraulically connected to the first hydraulic pump, and a second motor disposed in the transaxle housing and hydraulically connected to the second hydraulic pump;
   a first motor shaft driven by the first motor and extending from the first end of the transaxle housing and a second motor shaft driven by the second motor and extending from the second end of the transaxle housing, wherein the first and second motor shafts are perpendicular to the first and second pump shafts; and
   a power take off mechanism disposed in the transaxle housing between the first hydraulic pump and the second hydraulic pump and comprising a power take off output shaft extending from the transaxle housing, wherein the prime mover output shaft is drivingly engaged to the first and second pump shafts, the distal end of the prime mover output shaft extends into the power take off mechanism and is selectively coupled with the power take off output shaft.

8. The drive train assembly of claim 7, wherein the power take off mechanism is hydraulically actuated.

9. The drive train assembly of claim 8, wherein the power take off mechanism is controllable by a valve.

10. The drive train assembly of claim 8, further comprising an accumulator located in the transaxle housing.

11. The drive train assembly of claim 10, further comprising a fluid filter located in the transaxle housing.

12. The drive train assembly of claim 7, wherein the prime mover output shaft is aligned coaxially with the power take off output shaft.

13. The drive train assembly of claim 12, wherein the first motor shaft and the second motor shaft are coaxial.

14. The drive train assembly of claim 13, wherein the transaxle housing comprises a central housing, a first gear train housing disposed on one end of the central housing and having a first gear train disposed therein and driven by the first motor shaft, a second gear train housing disposed on another end of the central housing, opposite the one end and having a second gear train disposed therein and driven by the second motor shaft, wherein a first axle shaft extends from the first gear train housing and a second axle shaft extends from the second gear train housing.

15. A drive train assembly for mounting on a vehicle frame, the drive train assembly comprising:
   a transaxle having a transaxle housing configured to be mounted to the vehicle frame, the transaxle further comprising a pair of output shafts extending from opposite sides of the transaxle housing and having a coaxial first axis of rotation;

a pair of axles having a coaxial second axis of rotation offset from the first axis of rotation, each of the pair of axles being drivingly engaged to one of the pair of output shafts a prime mover mounted directly to the transaxle housing, and a prime mover output shaft extending from the prime mover into the transaxle and driving an input member, and rotation of the input member is transferred to the pair of output shafts;

a power take off disposed in the transaxle housing and comprising a power take off output shaft selectively powered by the input member, wherein the power take off output shaft and the prime mover output shaft have a coaxial third axis of rotation that is perpendicular to the first and second axes of rotation; and a plurality of mounting locations on the transaxle housing for engagement with the vehicle frame, whereby the transaxle and the prime mover are supported on the vehicle frame by the plurality of mounting locations.

16. The drive train assembly of claim 15, further comprising a fluid filter disposed inside the transaxle housing.

17. The drive train assembly of claim 15, wherein the power take off shaft is selectively actuated by a valve.

18. The drive train assembly of claim 17, wherein the valve is manually actuated.

19. The drive train assembly of claim 15, wherein the power take off output shaft is co-axial with the prime mover output shaft.

20. The drive train assembly of claim 15, wherein the transaxle housing comprises a central housing and a pair of gear train housings disposed on opposite sides of the central housing, and each of the pair of axles extends from one of the pair of gear train housings.

* * * * *